No. 794,152.

Patented July 4, 1905.

UNITED STATES PATENT OFFICE.

CHARLES S. PRICE, OF WESTMONT, PENNSYLVANIA.

PROCESS OF USING FLUE-DUST.

SPECIFICATION forming part of Letters Patent No. 794,152, dated July 4, 1905.

Application filed March 14, 1905. Serial No. 250,051.

*To all whom it may concern:*

Be it known that I, CHARLES S. PRICE, a citizen of the United States, and a resident of the borough of Westmont, in the county of Cambria and State of Pennsylvania, have invented certain new and useful Improvements in Processes of Using Flue-Dust; and I do hereby declare the following to be a full, clear, and exact description of the invention, such as will enable others skilled in the art to which it appertains to make and use the same.

In the operation of blast-furnaces, especially those using fine ores, large quantities of ore-dust are carried over into the downcomers, dust-catchers, flues, and passages, and not only is this fine ore or so-called "flue-dust" wasted, but it must be removed at a considerable expense, and therefore is a serious item of loss. This flue-dust, although rich in iron, is too fine to be recharged into the blast-furnace and smelted, because the rush of gases caused by the powerful air-blast in the furnace will carry most of it out again into the flues.

The object of my invention is to provide means for utilizing the blast-furnace flue-dust by putting it cheaply in such form that when charged into the furnace it will be reduced in due course of the operation and will not be blown out again. I attain this object by mixing a certain quantity of the flue-dust with a small portion of clay in a pug-mill or any other contrivance that will effect a thorough mixing of the ingredients. This mixture is moistened with water and may be formed into bricks or lumps in an ordinary auger brick-machine or similar apparatus. The clay may be in lumps or other natural condition; but I prefer to use ground clay, as it permits the mixture to be made more easily. I have found by actual trial and experiment that this mixture of clay and iron ore or flue-dust when made into plastic and coherent lumps by the addition of just enough water for this purpose may be charged directly into the blast-furnace with good results, thereby obviating the necessity and expense of molding or pressing it into brick form or of drying it in an oven or otherwise. This method of using the moist and plastic mixtures in lump form is conducive to economy in the highest degree and renders commercially possible the utilization of flue-dust and similar materials, which could not be accomplished otherwise by reason of the expense connected with a more complicated and lengthy operation.

The proportion of flue-dust to clay may of course be varied according to the iron contents of the flue-dust, its coarseness, and other properties, as may be readily understood.

The mixture made according to my improved process contains enough moisture and sufficient clay to provide a plastic compound that will not be blown out as dust after it is charged into the blast-furnace. It must be understood that clay being a variable material both in the same locality or deposit and in different localities it is impossible to exactly prescribe a proportion of this material which will give the best results with regard to the strength and coherence of the lumps and the other properties desired. It is also true that fine ores and flue-dust vary in their chemical and physical properties and in the degrees of fineness of their various particles, so that even with a comparatively uniform clay a different proportion of same might have to be used in order to accomplish the result desired on account of the different properties of various lots of ore or flue-dust, as will be readily understood. Under these conditions I do not wish to limit myself to exact and specific proportions of the different constituents of my mixture, but reserve the right to vary them as may be found necessary on account of the differences in clay, in fine ores, or flue-dust hereinbefore mentioned, and the quantity of water may also be varied, all in such a way as to produce the compound desired—namely, stiff, plastic, and coherent lumps of flue-dust or fine ore agglomerated by means of moist clay.

Although with the materials which I have ordinarily used I have made successfully plastic lumps with approximately four parts of flue-dust to one of clay and sufficient water to moisten the mass, it is possible by using clays of a finer state of division or greater plasticity, or both, to reduce this proportion, so that approximately one part of clay would suffice for eight parts of flue-dust or fine ore, together with the proper proportion of water. The amount of clay, which is exceedingly small compared with the total charge of the furnace, is useful in serving to increase the quantity or regulate the quality of cinder, as required in many cases, and it is much easier to smelt than the lean ores which are sometimes used for the same purpose, as will readily be understood by those skilled in the art of smelting ores. The clay being a silicate of alumina contains more silica than alumina, and a quality that I have found satisfactory contains about sixty-two per cent. of $SiO_2$ and eighteen per cent. of $Al_2O_3$, with moisture and a few other substances. Furthermore, the clay does not injure the lining of the furnace nor does it produce any other deleterious effects, while the saving in ore cost more than offsets the extra cost of coke and limestone required to smelt the added clay.

It will be readily understood that my improved process is applicable to the treatment of fine ores as well as flue-dust and that the process may be modified without departing from the principles of this invention as defined in the annexed claims.

Having thus described my invention, what I claim, and desire to secure by Letters Patent, is—

The process of using finely-divided ore or flue-dust, which consists in mixing approximately eight parts of the same with not less than one part of clay, sufficient water to make a stiff mass, forming same into plastic and coherent masses and charging said plastic lumps into a blast-furnace.

In testimony whereof I hereto affix my signature in the presence of two witnesses.

CHARLES S. PRICE.

Witnesses:
 GEO. BEATTY,
 ELMER LEAVEY.